July 11, 1939.  W. W. SLOANE  2,165,583
FEEDING MECHANISM FOR SHAKER OR JIGGING CONVEYERS
Original Filed Oct. 3, 1936   2 Sheets-Sheet 1
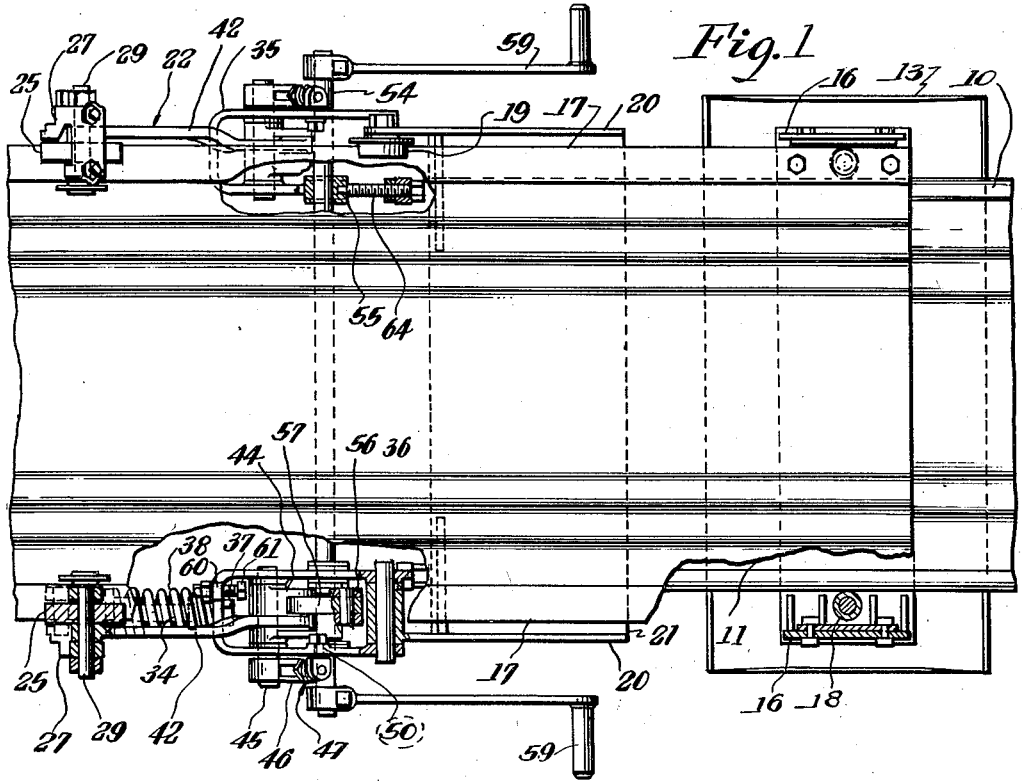
Inventor
William W. Sloane
Clarence F. Poole
Attorney July 11, 1939.  W. W. SLOANE  2,165,583
FEEDING MECHANISM FOR SHAKER OR JIGGING CONVEYERS
Original Filed Oct. 3, 1936  2 Sheets-Sheet 2
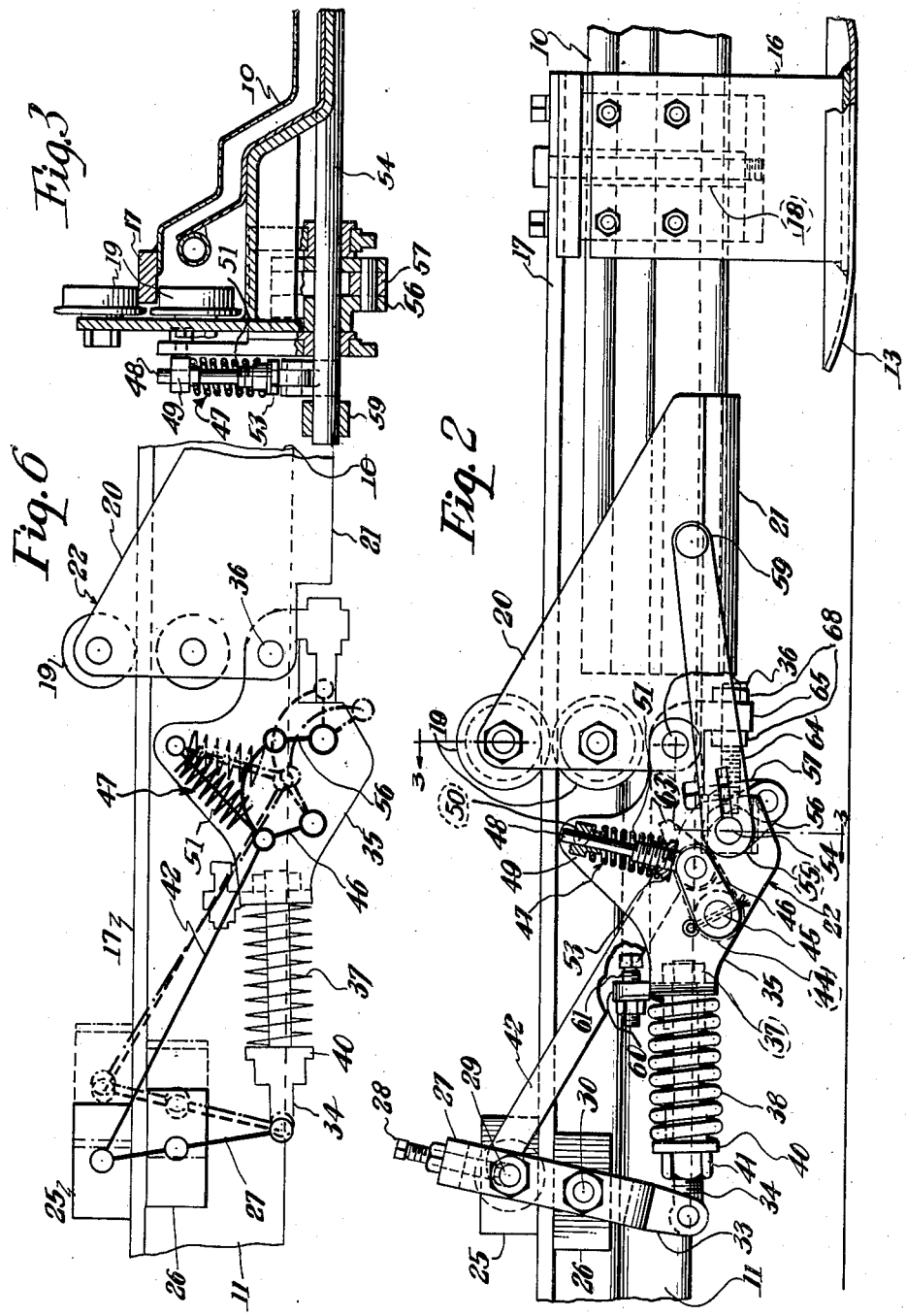
Inventor
William W. Sloane
Clarence F. Poole
Attorney Patented July 11, 1939

2,165,583

UNITED STATES PATENT OFFICE 2,165,583

FEEDING MECHANISM FOR SHAKER OR JIGGING CONVEYERS

William W. Sloane, Chicago, Ill., assignor to Goodman Manufacturing Company, Chicago, Ill., a corporation of Illinois Application October 3, 1936, Serial No. 103,825
Renewed September 3, 1938

13 Claims. (Cl. 198—220)

This invention relates to improvements in feeding mechanisms for shaker or jigging conveyers of the type utilized for picking up and transporting loose material such as coal, rock, or the like.

Among the objects of my invention are to provide a feeding mechanism of a novel construction attached to the forward end of a reciprocating conveyer which is so arranged that feeding of an extensible trough section may be effected by the reciprocating action of the conveyer in a simple and efficient manner.

Another object of my invention is to so arrange the feeding mechanism that the gripping action of the feeding mechanism will be uniform regardless of the angle of inclination of the extensible trough section with respect to the conveyer trough from which it is adapted to be extended.

A prior application, Serial No. 86,154, filed by Ernst R. Bergmann on June 19, 1936, and entitled Feeding mechanisms for shaker or jigging conveyers, which issued as Patent No. 2,154,060 on April 11, 1939, shows a feeding mechanism constructed along lines similar to that of my present invention. My present invention, however, differs from said prior application in affording adjustment of the leverage arrangement and supporting means for the clamping devices so as to permit the same angular relationship between the links and clamping devices to be maintained when the extensible trough section is inclined upwardly or downwardly with respect to the main conveyer trough section.

My invention may be more clearly understood with reference to the accompanying drawings wherein:

Figure 1 is a detail fragmentary plan view of a portion of a conveyer trough line having a feeding mechanism constructed in accordance with my invention associated therewith, with parts of the conveyer trough line and feeding mechanism broken away and shown in horizontal section in order to illustrate certain details of my invention;

Figure 2 is a detail side elevation of the device shown in Figure 1 with parts shown in substantially longitudinal section;

Figure 3 is a transverse fragmentary sectional view taken substantially along lines 3—3 of Figure 2;

Figures 4 and 5 are side elevational views of the feeding mechanism showing the extensible trough operating where the ground is inclined upwardly and downwardly with respect to the main trough line; and Figure 6 is a diagrammatic view showing several operative positions of the clamping devices and levers controlling the positioning thereof.

In the drawings, the main elements of the embodiment of the invention illustrated consist of a reciprocating trough section 10, connected to the forward end of a reciprocating shaker conveyer pan line, which has an extensible trough section or pick-up member 11 extending from the forward end thereof and adapted to be telescopically extended or retracted with respect thereto. Said extensible trough section is provided with a forwardly projecting flared gathering shovel 12 which is adapted to rest on and slidably move along the ground.

The extensible trough section or pick-up member 11 is adapted to slide along the ground at its forward end on the end of the gathering shovel 12, and is supported above the ground at its rear end on a shoe 13, which slidably engages the ground. Said shoe is connected with said trough section by means of a pair of parallel spaced uprights 16, 16 extending from opposite sides thereof upwardly along each side of the conveyer trough section 10. Said uprights are secured at their upper ends to the under side of bearing plates 17, 17, which extend laterally from the upper flanges of said extensible trough section. Suitable rollers 18, 18 are mounted in the uprights 16, 16 for engagement with the sides of said reciprocating conveyer trough section.

The forward end of the reciprocating trough section 10 is supported and guided for reciprocable movement along the extensible trough section 11 by means of two sets of parallel-spaced flanged rollers 19, 19. Said rollers are mounted in upstanding sides 20, 20 of a bracket member 21 of a feeding head 22. Said bracket member extends across the bottom of and upwardly along the sides of said reciprocating trough section and may be secured thereto in any suitable manner.

Each of the rollers 19 includes one roller adapted to rest on and roll along the upper surface of the bearing plate 17 and another roller disposed beneath said bearing plate and acting as a guide to prevent vertical displacement of said trough sections with respect to each other. The flanges of said rollers are adapted to engage the outer sides of the bearing plates 17, 17 and cooperate with the rollers 18, 18 to guide the pick-up member 11 against lateral displacement.

It will be seen from the foregoing that since the extensible trough section or pick-up member 11 is supported for slidable movement along the ground at its forward and rearward ends, that the frictional resistance of said extensible trough section against the ground, together with the lack of frictional resistance between the troughs due to the anti-friction support afforded by the rollers 19, 19, is such that said extensible trough will tend to remain stationary while said reciprocating trough section reciprocably moves therealong, when the feeding mechanism is disengaged from the bearing plates 17, 17.

With reference now to the details of the clamping mechanism of the feeding head and the novel arrangement whereby the extensible trough section or pick-up member 11 may be extended or retracted with respect to the reciprocating trough section 10 by the action of the shaker conveyer, said feeding head includes two clamping devices disposed in advance of the trough section 10 on opposite sides thereof. Each of said clamping devices includes a set of friction grip blocks 25 and 26 adapted to engage the upper and lower sides respectively of one of the bearing plates 17. Each set of said friction grip blocks is mounted in a carrier member 27 having an upper portion of a C-shaped formation which is so arranged that the open portion thereof extends inwardly along the bearing plate 17. The construction and operation of each of said clamping devices is similar, so a description of one will suffice for both.

The upper friction grip block 25 is mounted in the C-shaped carrier member 27 above the open portion thereof on a transversely extending bolt 29 extending through said carrier member. Said bolt is mounted in suitable slots extending along said carrier member to permit adjustable movement of said grip block towards or from the grip block 26 by means of adjusting screws 28, 28 in a usual manner (see Figure 2). The lower friction grip block 26 is mounted below the open portion of said carrier member on a bolt 30 extending through said carrier member.

The carrier member 27 has a depending ear 33 to which is pivoted a threaded eye bolt 34 which extends rearwardly therefrom. Said eye bolt is slidably mounted in the closed forward end of a U-shaped bracket 35. The legs of said bracket are pivotally connected to the forward lower end of an upstanding side 20 of the bracket member 21 on a pivotal pin 36. A nut 37 threaded on the end of said bolt abuts the inner side of the closed forward end of said bracket. A compression spring 38 encircles said bolt and a lug 39 extending from said bracket, and is interposed between the outer side of said bracket and a collar 40. Said collar abuts a nut 41 threaded on said bolt adjacent the carrier member 27. The eye bolt thus forms a pivotal support for the carrier member 27 about which said carrier member pivots during clamping and unclamping of the grip blocks and bodily moves with the bracket 35 about the axis of the pin 36 when the troughs are inclined with respect to each other in vertical planes. Said compression spring permits rearward movement of said eye bolt with respect to said bracket when the forward end of the shovel engages an obstruction and thus forms a means for releasing the grip blocks 25 and 26 from their associated bearing plate 17 on a predetermined load on the end of the shovel.

The upper end of the carrier member 27 has a link 42 pivotally connected thereto on the bolt 29. Said link extends angularly rearwardly and downwardly from said bolt along the side of the extensible trough 11 and has a downwardly curved rearward end which is pivotally connected to a bifurcated crank arm 44, between the furcations thereof. Said crank arm is mounted on a transverse shaft 45 which is mounted between the legs of the bracket member 35 adjacent its ends. An end of said shaft projects outwardly beyond said bracket and has a crank arm 46 secured thereto. Said last-named crank arm has a bifurcated end to which is pivotally connected a spring link 47. Said spring link includes a threaded member 48 pivotally connected to the end of the crank arm 46 which slidably engages a block 49 pivotally mounted on the bracket 35 adjacent the upper end thereof. Said block has a stud 50 extending inwardly from one side thereof which is mounted in the outer side of the bracket 35 and is held in place by means of a suitable nut in a usual manner. A compression spring 50 encircles the threaded member 48 and is interposed between a shoulder on the block 49 and a nut 53. Said nut is threaded on said threaded member adjacent the crank arm 46 and forms a means for adjusting the tension of said spring. Thus, said spring link continually exerts pressure against the crank arm 46 and forms a means against which said crank arm reacts upon movement of the link 42 to hold the carrier members 27, 27 and grip blocks 25 and 26 in the proper gripping position with respect to their associated bearing plate 17, as may clearly be seen with reference to Figure 2.

A shaft 54 extends transversely across the bottom of the extensible trough 11 and is pivotally mounted adjacent its ends in the brackets 35, 35 in blocks 55, 55 which are adjustably mounted in the inner legs of said brackets. Said shaft has a pair of spaced cranks 56, 56 secured thereto, each of which cranks is mounted between the legs of one of the brackets 35. The crank arm 44 is connected with the crank 56 by means of a link 57. Said link is of a curved formation with its ends extending downwardly in order that it may clear the crank 56 and shaft 54 when said crank is in an extreme lower position. A suitable hand lever 59 is provided on each end of said shaft for pivotally moving said shaft and positioning the carrier member 27 for extending or retracting the extensible trough section with respect to the conveyor trough section or locking the grip blocks 25 and 26 in an engaged position with respect to the bearing plates 17, 17.

Suitable means are provided to permit adjustment of the carrier members 27, 27 and grip blocks 25 and 26, which means, as herein shown, includes a lug 60 projecting upwardly from the forward end of each bracket 35. Said lug has a bolt 61 threaded therein, the head of which bolt is adapted to be engaged by an upwardly extending projection 63 from the crank arm 44 and forms a stop for said crank arm 44. Said bolts, being properly set, thus form a means for determining the proper angular relationship of the carrier members 27, 27 and grip blocks 25 and 26 with respect to the bearing plates 17, 17. when said carrier members are in a forwardly inclined position. The position of said carrier member may readily be changed to take care of wear on said grip blocks or other parts of the mechanism by changing the position of adjustment of the bolt 61.

Adjustment of the transversely extending shaft 54 to take care of wear of the parts of the device is effected by means of adjusting screws 64, 64 extending through a depending projection 65 from the rearward end of the brackets 35, 35. The forward end of each of said adjusting screws engages one of the blocks 55 for translationally moving said block therewith upon rotation thereof. Said blocks each have the shaft 54 rotatably mounted therein as previously described. Adjustment may be effected by turning one or the other of a pair of nuts 68, 68 which abut opposite sides of each of the depending projections 65, 65 for moving said associated bolt through said projection.

It will be seen from the foregoing that the entire clamping mechanism is mounted on the brackets 35, 35 for bodily movement therewith and that said brackets are in turn pivotally connected to the forward end of the conveyor trough section 10 on the forward end of the bracket member 21. Thus, when the extensible trough section is inclined upwardly or downwardly with respect to the conveyer trough section for gathering along an ascending or descending grade, as in Figures 4 and 5, the entire clamping mechanism will move up or down as a unit and the angular relationship of the carrier members and links which control operation of the grip blocks will not change when the troughs are in various angular relationships with respect to each other. Thus, a uniform gripping action of the grip blocks will be insured for all positions of the extensible trough section with respect to the conveyer trough section.

Referring now particularly to Figures 4, 5 and 6 and the operation of the feeding mechanism, the grip blocks 25 and 26 are shown in position to extend the extensible trough section in Figures 4 and 5 which position is also indicated by dotted lines in Figure 6. This position is attained by pivoting the shaft 54 in a clockwise direction by means of either one of the hand levers 59, 59 until a position is reached when the carrier member 27 is inclined in a rearward direction. When the carrier members 27, 27 and grip blocks 25 and 26 are in this position, said carrier members will be pivoted about their axes of connection to the links 42, 42 by means of the links formed by the eye bolts 34, 34, upon the forward stroke of the conveyer. This will engage said grip blocks with the bearing plates 17, 17. This will cause the extensible trough section 11 to move forwardly with the reciprocating trough section 10. Upon the return stroke of the conveyer, frictional resistance of the trough section 11 against the ground on the forward end of the shovel 12 and the shoe 13 will hold said trough section from movement with respect to the ground. This will cause the carrier members 27, 27 to pivot in a counterclockwise direction about their axes of connection to the links 42, 42 and permit the blocks 25 and 26 to be disengaged from the bearing plates 17, 17. At the same time the links 42, 42 will tend to pivot the crank arms 44, 44 and 46, 46 in an upward direction against the compression springs 51, 51. As soon as the return stroke has been completed, said compression springs will tend to move said cranks in a downward direction to properly position said grip blocks with respect to said bearing plates.

When the parts are positioned for retracting the extensible trough section within the conveyor trough section and the carrier members 27, 27 are inclined in a forward direction by movement of either one of the hand levers 59 in a counterclockwise direction, as is shown by solid lines in Figure 6, the pull of the eye bolts 34, 34 on said carrier members upon the return stroke of the conveyer will pivot said carrier members in a counterclockwise direction about their axes of pivotal connection to the links 42, 42 and engage the grip blocks 25 and 26 with the bearing plates 17, 17. The pushing action of said eye bolts on said carrier members will tend to pivot said carrier members in a clockwise direction upon the forward stroke of the conveyer and release said grip blocks from said bearing plates.

When it is desired to positively lock the grip blocks in an engaged position with respect to the bearing plates 17, 17, the hand levers 59 are moved in a clockwise direction to the position shown by dot and dash lines in Figure 6 which is beyond the forward extending position of said grip blocks. In this position said grip blocks are held in positively clamped position for the reason that the positions of the links 57, 57 and cranks 56, 56 are past dead center with respect to the links 42, 42.

While I have herein shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated, excepting as it may be limited in the appended claims.

I claim as my invention:

1. In a reciprocating conveyer, a conveyer trough section, an extensible trough section, means for extending or retracting said extensible trough section with respect to said conveyer trough section comprising a clamping device, means for oscillating said clamping device into and out of clamping position with respect to said extensible trough section, and a bracket pivotally connected to said conveyer trough section for movement in a vertical plane, said bracket having said means for oscillating said clamping device into and out of clamping position mounted thereon and also having said clamping device mounted thereon and disposed in advance thereof for bodily movement therewith.

2. In a reciprocating conveyer, a conveyer trough section, an extensible trough section telescopically extensible or retractible with respect to said conveyer trough section, and means for extending or retracting said extensible trough section with respect to said conveyer trough section comprising a clamping device, means for oscillating said clamping device into and out of clamping position with respect to said extensible trough section, and a supporting means for said clamping device permitting free movement thereof with respect to said conveyer trough section and permitting angular movement of said trough sections with respect to each other without disturbing the angular relationship of said clamping device with respect to said extensible trough section comprising a bracket extending from said conveyer trough section and pivotally connected thereto, said bracket having said means for oscillating said clamping device into and out of clamping position mounted thereon and also having said clamping device mounted thereon and disposed in advance thereof for bodily movement therewith.

3. In a reciprocating conveyer, a conveyer trough section, an extensible trough section telescopically extensible or retractible with respect to said conveyer trough section, and means for extending or retracting said extensible trough section with respect to said conveyer trough section comprising a clamping device, means for oscillating said clamping device into and out of clamping position with respect to said extensible trough section comprising a link pivotally connected to one end of said clamping device and forming a fulcrum therefor, another link pivotally connected adjacent the other end of said clamping device, a crank having its free end pivotally connected to the end of said second-mentioned link, yieldable means against which said crank is adapted to react, and a common supporting means for said links, crank and yieldable means permitting angular movement of said trough sections with respect to each other without disturbing the angular relationship of said parts of said clamping device comprising bracket extending from and pivotally connected to said conveyer trough section for movement in a vertical plane, said bracket having said means for oscillating said clamping device into and out of clamping position mounted thereon and also having said clamping device mounted thereon and disposed in advance thereof for bodily movement therewith.

4. In a reciprocating conveyer, a conveyer trough section, an extensible trough section telescopically extensible or retractible with respect to said conveyer trough section, and means for extending or retracting said extensible trough section with respect to said conveyer trough section comprising a clamping device, means for oscillating said clamping device into and out of clamping position with respect to said extensible trough section comprising a link pivotally connected to one end of said clamping device and forming a fulcrum therefor, a bracket pivotally connected to and extending from said conveyer trough section for movement in a vertical plane and forming a support for said clamping device whereby said clamping device may move bodily therewith, a slidable connection between said link and bracket and yieldable means permitting yieldable movement of said link with respect to said bracket, another link pivotally connected adjacent the other end of said clamping device, a crank pivotally connected to said bracket, a pivotal connection between said link and crank, and yieldable means against which said crank is adapted to react for holding said clamping device in the proper position of adjustment with respect to said extensible trough section.

5. In a reciprocating conveyer, a conveyer trough section, an extensible trough section telescopically extensible or retractible with respect to said conveyer trough section, and means for extending or retracting said extensible trough section with respect to said conveyer trough section comprising a clamping device, means for oscillating said clamping device into and out of clamping position with respect to said extensible trough section comprising a link pivotally connected to one end of said clamping device and forming a fulcrum therefor, a bracket pivotally connected to and extending from said conveyer trough section for movement in a vertical plane and forming a support for said clamping device whereby said clamping device may move bodily therewith, a slidable connection between said link and bracket and yieldable means permitting yieldable movement of said link with respect to said bracket, another link pivotally connected adjacent the other end of said clamping device, a crank pivotally connected to said bracket, a pivotal connection between said link and crank, yieldable means against which said crank is adapted to react, another crank for positioning said clamping device for extending or retracting said extensible trough section, and a connection between said link and second-mentioned crank whereby movement of said second-mentioned crank will move said clamping device in position to extend or retract said extensible trough section.

6. A loading attachment for shaker conveyers comprising an extensible trough section slidably movable along the ground and adapted to form a support for a reciprocatory trough section attached to the end of a conveyer, a connection between said reciprocatory trough section and said extensible trough section operable by reciprocable movement of the conveyer due to resistance of said extensible trough section on the ground for automatically extending or retracting said extensible trough section with respect to said reciprocatory trough section including a clamping device disposed in advance of said reciprocatory trough section and adapted to engage said extensible trough section above and below a portion thereof, a link pivotally connected adjacent one end of said clamping device, another link pivotally connected adjacent the other end of said clamping device, and common supporting means for said links permitting free movement of said clamping device with respect to said conveyer trough section in a vertical plane without disturbing the angular relationship of said links and clamping device with respect to said extensible trough section comprising a bracket extending from said conveyer trough section and pivotally connected to the forward end thereof.

7. A loading attachment for shaker conveyers comprising an extensible trough section slidably movable along the ground and adapted to form a support for a reciprocatory trough section attached to the end of a conveyer, a connection between said reciprocatory trough section and said extensible trough section operable by reciprocable movement of the conveyer due to resistance of said extensible trough section on the ground for automatically extending or retracting said extensible trough section with respect to said reciprocatory trough section including a clamping device disposed in advance of said reciprocatory trough section and adapted to engage said extensible trough section above and below a portion thereof, a link pivotally connected to one end of said clamping device and forming a fulcrum therefor, another link pivotally connected to the other end of said clamping device, a crank having its free end pivotaly connected to the end of said second-mentioned link, yieldable means agains which said crank is adapted to react, a bracket pivotally connected to and extending from said conveyer trough section for movement in a vertical plane and forming a common supporting means for said links, crank, and yieldable means, permitting angular movement of said trough sections with respect to each other without disturbing the angular relationship of the parts of said clamping device.

8. In a reciprocating conveyer, a conveyer trough section, an extensible trough section, and means actuated by reciprocable movement of the conveyer for extending or retracting said extensible trough section with respect to said conveyer trough section comprising a clamping device, means for oscillating said clamping device into and out of clamping position with respect to said extensible trough section including a bracket disposed in advance of said conveyer trough section, a connection between said bracket and the lower end of said clamping device, a connection between the upper end of said clamping device and said bracket, said means for oscillating said clamping device into and out of clamping position with respect to said extensible trough section being mounted on said bracket, and said clamping device being disposed in advance of said bracket, and a pivotal connection between said bracket and the forward end of said conveyer trough section whereby said clamping device may move bodily with said bracket to permit angular movement of said extensible trough section with respect to said conveyer trough section in a vertical plane without disturbing the angular relationship of the parts of said clamping device.

9. In a reciprocating conveyer, a conveyer trough section, an extensible trough section telescopically extensible with respect to said conveyer trough section, and means actuated by reciprocable movement of the conveyer for extending or retracting said extensible trough section with respect to said conveyer trough section including a clamping device, and means for oscillating said clamping device into and out of clamping position with respect to said trough section including a bracket disposed in advance of said conveyer trough section, a shaft extending transversely thereof, a link connecting said bracket with the lower end of said clamping device, another link connecting the upper end of said clamping device with said shaft whereby movement of said shaft will position said clamping device for extending or retracting said extensible trough section, and a pivotal connection between said bracket and the forward end of said conveyer trough section whereby said clamping device may move bodily with said bracket to permit angular movement of said extensible trough section with respect to said conveyer trough section in a vertical plane without disturbing the angular relationship of the parts of said feeding device.

10. In a reciprocating conveyer, a conveyer trough section, an extensible trough section telescopically extensible with respect to said conveyer trough section, and means actuated by reciprocable movement of the conveyer for extending or retracting said extensible trough section with respect to said conveyer trough section including a clamping device, and means for oscillating said clamping device into and out of clamping position with respect to said conveyer trough section including a bracket disposed in advance of said conveyer trough section, a link yieldably connecting said bracket with the lower end of said clamping device, a shaft extending transversely of said bracket, a crank arm on said shaft, a link connecting the upper end of said clamping device with said crank arm and yieldable means for holding said crank arm in adjusted relationship with respect to said link, and a pivotal connection between said bracket and the forward end of said conveyer trough section whereby the parts of said feeding device may move bodily with said bracket to permit angular movement of said extensible trough section with respect to said conveyer trough section in a vertical plane without disturbing the angular relationship of the parts of said feeding device.

11. In a reciprocating conveyer, a conveyer trough section, an extensible trough section telescopically extensible with respect to said conveyer trough section, and means actuated by reciprocable movement of the conveyer for automatically extending or retracting said extensible trough section with respect to said conveyer trough section comprising a clamping device including a carrier member having a pair of friction grip blocks mounted therein and adapted to engage said extensible trough section above and below a portion thereof, and means for rocking said blocks into and out of clamping engagement with respect to said conveyer trough actuated by movement of the conveyer due to resistance of said extensible trough section on the ground comprising a link pivotally connected to one end of said carrier member, another link pivotally connected adjacent the opposite end of said carrier member, and supporting means for said links permitting angular movement of said trough sections with respect to each other without disturbing the angular relationship of said links with respect to each other comprising a bracket pivotally connected adjacent the forward end of said conveyer trough section and having the parts of said feeding device bodily movable therewith.

12. In a reciprocating conveyer, a conveyer trough section, an extensible trough section, and means actuated by reciprocable movement of the conveyer for automatically extending or retracting said extensible trough section with respect to said conveyer trough section comprising a clamping device including a carrier member having a pair of friction grip blocks mounted therein and adapted to engage said extensible trough section above and below a portion thereof, and means for rocking said blocks into and out of clamping engagement with respect to said conveyer trough actuated by movement of the conveyer due to resistance of said extensible trough section on the ground comprising a link pivotally connected to the lower end of said carrier member, another link pivotally connected to said carrier member adjacent the upper end thereof, a crank pivotally connected to the end of said second-mentioned link, a spring link adapted to engage said crank to hold said grip blocks in the proper position of adjustment with respect to said extensible trough section, and a common supporting means for said links, crank and spring link permitting angular movement of said trough sections with respect to each other without disturbing the angular relationship of said links with respect to each other comprising a bracket pivotally connected to the forward end of said conveyer trough section.

13. In a reciprocating conveyer, a conveyer trough section, an extensible trough section, and means actuated by reciprocable movement of the conveyer for automatically extending or retracting said extensible trough section with respect to said conveyer trough section comprising a pair of clamping devices, each of which includes a carrier member having a pair of friction grip devices mounted therein and adapted to engage said extensible trough section above and below a portion thereof, and means for rocking said devices into and out of clamping engagement with respect to said extensible trough section actuated by movement of the conveyer due to resistance of said extensible trough section on the ground comprising a pair of links, each of said links being pivotally connected to one end of each of said carrier members, another pair of links, each of said links being pivotally connected to the other end of each of said carrier members, a pair of cranks, each of said cranks being pivotally connected to the end of each of said links, spring links against which said cranks are adapted to react, and common supporting means for each set of said links, cranks and spring links permitting angular movement of said trough sections with respect to each other without disturbing the angular relationship of said links with respect to each other comprising a bracket pivotally connected to each side of the forward end of said conveyer trough section.

WILLIAM W. SLOANE.